(12) United States Patent
Staley

(10) Patent No.: US 9,765,856 B2
(45) Date of Patent: Sep. 19, 2017

(54) HYDRAULIC CHAIN TENSIONER WITH OIL RESERVOIR FOR INVERTED INSTALLATIONS

(71) Applicant: GM Global Technology Operations LLC, Detroit, MI (US)

(72) Inventor: Eric D. Staley, Flushing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 153 days.

(21) Appl. No.: 14/842,012

(22) Filed: Sep. 1, 2015

(65) Prior Publication Data

US 2017/0059011 A1 Mar. 2, 2017

(51) Int. Cl.
*F16H 7/08* (2006.01)
*F16H 7/02* (2006.01)
*F16H 7/06* (2006.01)

(52) U.S. Cl.
CPC .............. *F16H 7/0838* (2013.01); *F16H 7/02* (2013.01); *F16H 7/06* (2013.01); *F16H 7/08* (2013.01); *F16H 2007/0806* (2013.01); *F16H 2007/0812* (2013.01); *F16H 2007/0814* (2013.01); *F16H 2007/0859* (2013.01); *F16H 2007/0872* (2013.01); *F16H 2007/0893* (2013.01)

(58) Field of Classification Search
CPC .......... F16L 55/1658; F16H 2007/0812; F16H 2007/0872; F16H 2007/0893; F16H 7/0838; F16H 7/02; F16H 7/06; F16H 7/08; F16H 2007/0806; F16H 2007/0814; F16H 2007/0859

USPC .......................................................... 474/110
See application file for complete search history.

(56) References Cited

U.S. PATENT DOCUMENTS

| | | | | |
|---|---|---|---|---|
| 5,643,117 A | * | 7/1997 | Dembosky | F16H 7/0848 474/110 |
| 5,797,817 A | * | 8/1998 | Senftleben | F01L 1/02 474/110 |
| 5,833,220 A | * | 11/1998 | Nakakubo | F16H 7/08 188/266.2 |
| 5,967,921 A | * | 10/1999 | Simpson | F16H 7/08 474/110 |
| 6,312,351 B1 | * | 11/2001 | Simpson | F16H 7/0848 474/109 |
| 6,322,468 B1 | * | 11/2001 | Wing | F16H 7/08 474/109 |

* cited by examiner

*Primary Examiner* — William E Dondero
*Assistant Examiner* — Robert T Reese
(74) *Attorney, Agent, or Firm* — Harness, Dickey & Pierce, P.L.C.

(57) ABSTRACT

A tensioner device, includes a housing defining a cavity with a plunger disposed in the cavity. A spring is engaged with the plunger for biasing the plunger in an outward direction. An oil passage is in communication with the cavity for delivering pressurized oil to the cavity and an oil reservoir is disposed in the housing and in communication with the cavity. The oil reservoir includes a vent opening at a vertical level at least as high as the oil passage into the cavity so that oil is maintained with the cavity when the tensioner is installed in an inverted orientation.

19 Claims, 3 Drawing Sheets

HYDRAULIC CHAIN TENSIONER WITH OIL RESERVOIR FOR INVERTED INSTALLATIONS

FIELD

The present disclosure relates to a hydraulic belt or chain tensioner with an oil reservoir for inverted installations to prevent leaking from the high-pressure chamber of the tensioner.

BACKGROUND AND SUMMARY

This section provides background information related to the present disclosure which is not necessarily prior art.

Hydraulic tensioners are used for applying tension against a chain or belt for preventing chain rattle or belt slippage in an auxiliary drive system of an engine or in other industrial machines. In a typical hydraulic tensioner 100, as shown in FIG. 3, a plunger 102 is disposed within a cavity 104 of a housing 106 and is biased against a tensioner shoe 108 for applying a tension force against a belt or chain. A high pressure oil is introduced into the cavity for damping movement of the plunger. The oil is forced from the high-pressure chamber where it passes around the plunger 102 and into the chain cavity. In an inverted installation, gravity can pull the oil from the high-pressure chamber 104 (as illustrated by the arrows "A"), creating a high-pressure chamber that is starved for oil after an engine sits for some time. Accordingly, it is desirable to provide a hydraulic chain tensioner that does not drain out when installed in an inverted application.

According to the present disclosure, a hydraulic chain or belt tensioner is provided with an oil reservoir for inverted installations. The reservoir is added to the tensioner such that as oil is forced out of the high-pressure chamber the reservoir receives the oil and will hold oil within the high-pressure chamber during shutdown. The reservoir will maintain a sufficient level of oil in the high-pressure chamber to prevent startup chain rattle and inconsistent oil column stiffness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Figure 1:
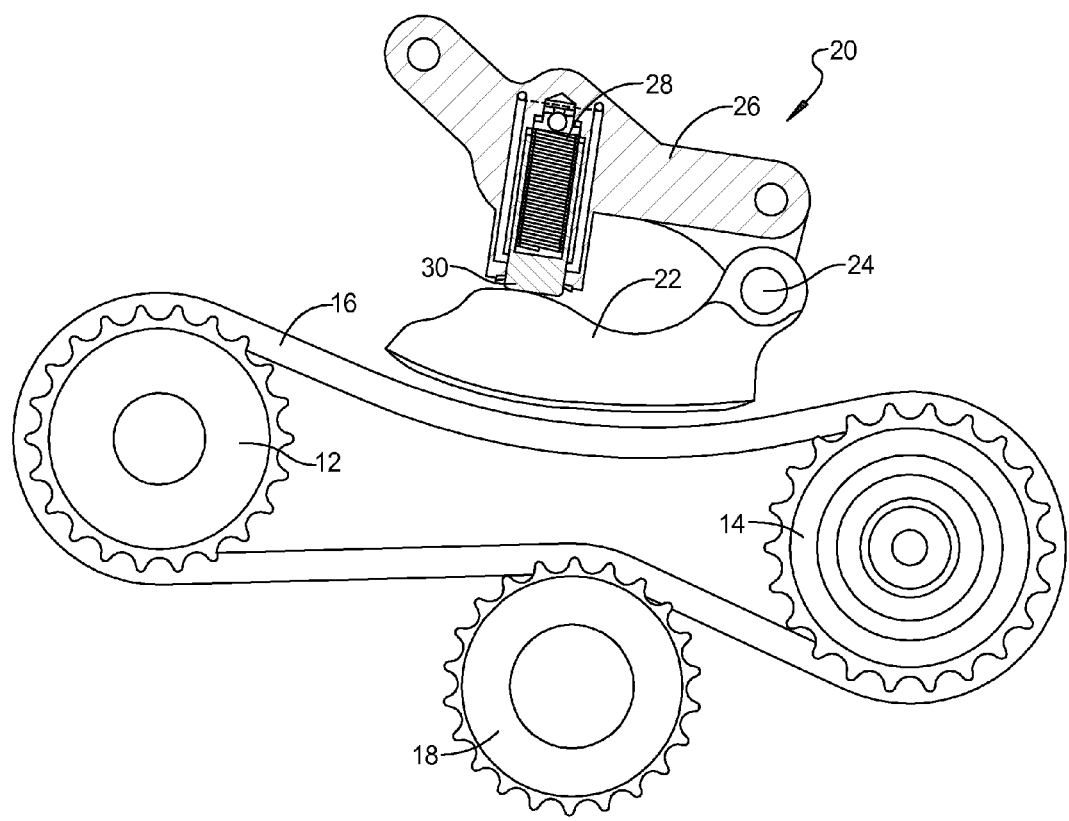
FIG. 1 is a schematic illustration of a belt or chain drive system employing a tensioner device according to the principles of the present disclosure.

With reference to FIG. 1, a belt or chain tensioner device 10 is shown including a first sprocket or pulley 12 and a second sprocket or pulley 14. A belt or chain 16 is shown drivingly engaged with the first sprocket or pulley 12 and the second sprocket or pulley 14. Additional sprockets or pulleys 18 can also be engaged with the belt or chain 16 for providing or receiving drive torque to/from various components of an engine or other industrial machine. A tensioner device 20 is provided in engagement with the belt or chain 16 for applying a tensioning force thereto.

Figure 2:
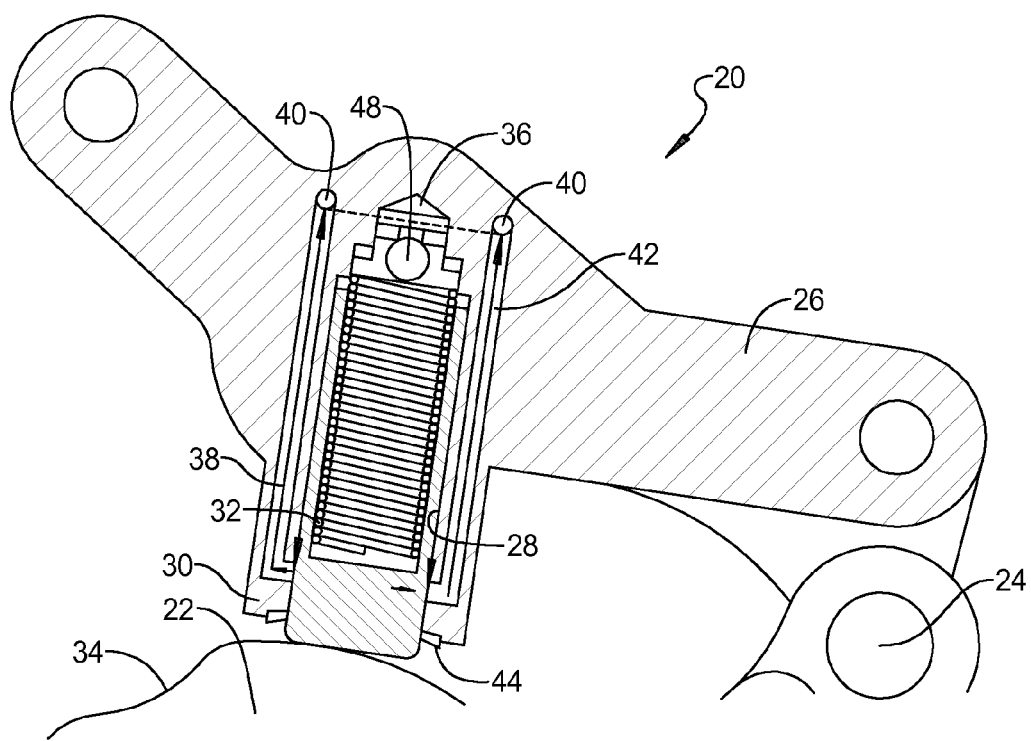
FIG. 2 is a partial cross-sectional view of a tensioner device according to the principles of the present disclosure.
Figure 3:
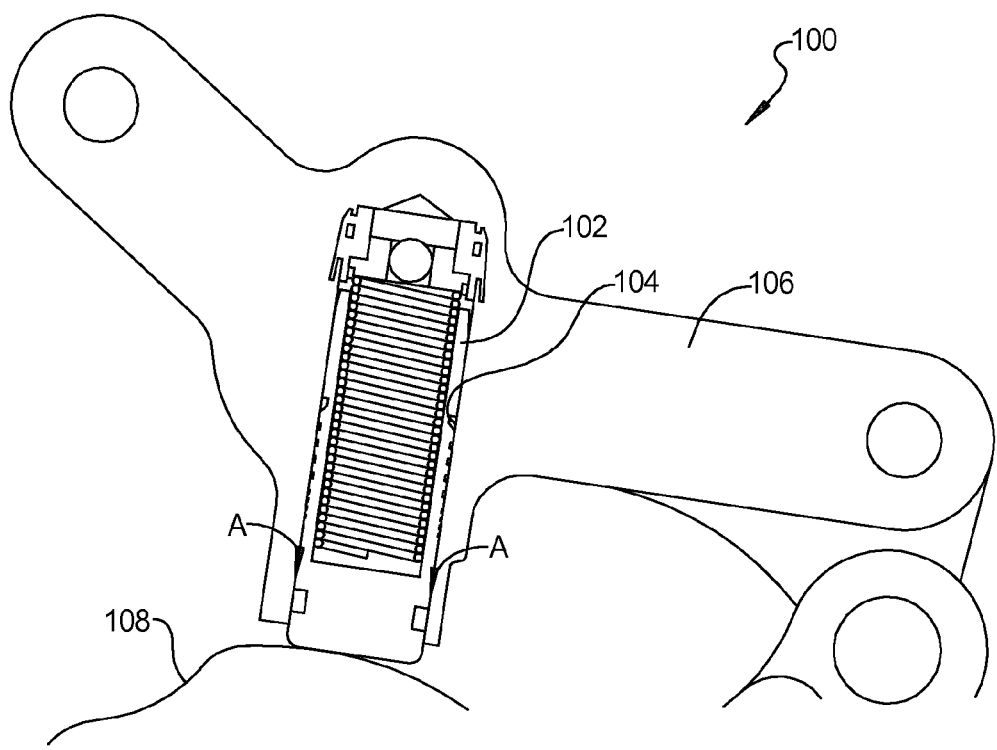
FIG. 3 is a partial cross-sectional view of a tensioner device illustrating a problem of the prior art tensioners.

The tensioner device 20 can include a pivoting shoe 22 that engages the belt or chain 16 and is pivotable about a pivot 24. A housing or other support structure 26 defines a cavity 28. As best shown in FIG. 2, a plunger 30 is received in the cavity 28 along with a spring 32 that biases the plunger 30 in an outward direction against an opposing surface 34 of the shoe 22. An oil passage 36 is provided in communication with the cavity 28 for providing pressurized oil to the cavity 28. An oil reservoir 38 is disposed in the housing 26 and in communication with the cavity 28. The oil reservoir 38 has a vent opening 40 at a vertical level at least as high as the oil passage 36 into the cavity 28. The oil reservoir 38 can surround the cavity 28 or can be formed as one or more separate bores within the housing 26 that extend vertically to the vent opening 40. In the case where the oil reservoir 38 is formed as an annular space surrounding the cavity 28, a sleeve 42 can be inserted into the housing 26 to separate the cavity 28 from the oil reservoir 38. In the case where the oil reservoir 38 is formed as one or more separate bores, the bores can be drilled into the housing 26.

A seal 44 can be supported by the housing 26 in sliding engagement with the plunger 32 to seal in oil from leaking past the plunger 30. The hydraulic tensioner 20 is designed to be used in an inverted position where the plunger 30 is disposed vertically above the shoe 22 and maintains the pressing force against the shoe 22 in order to tension the belt or chain 16. The spring 32 within the cavity 28 maintains a force against the plunger 30 while the pressurized oil within the cavity damps movement of the plunger 30 to prevent chain or belt rattle or slip. The displacement of the plunger effectively pumps oil from a source and the resistance to flow around the plunger causes an increase in pressure which also creates a reaction force against the plunger that inhibits or damps its motion. The oil supply also includes a check valve 48 to prevent back flowing of oil due to plunger displacement.

Because the reservoir 38 provides oil at startup, there is no delay for maintaining the cavity 28 full so that there is reduced chain rattle at startup and improved chain control. Because the oil is maintained in the reservoir at startup, the damping is initiated right away. In addition, the oil reservoir renders the tensioner device 20 insensitive to being mounted in an inverted orientation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tensioner device, comprising:
   a housing defining a cavity having a vertically upper end and a vertically lower end;
   a plunger disposed in said cavity and extending from the vertically lower end of said cavity;
   a spring engaged with the plunger for biasing the plunger vertically downward in an outward direction;
   an oil passage placed at the vertically upper end of the cavity for delivering pressurized oil to the cavity; and
   an oil reservoir disposed in the housing and in communication with the vertically lower end of the cavity, the oil reservoir having a vent opening at a vertical level at least as high as the oil passage into the cavity.

2. The tensioner device according to claim 1, further comprising a pivoting shoe that is engaged with the plunger.

3. The tensioner device according to claim 2, wherein the pivoting shoe is adapted to engage a belt or chain for applying a tension force thereagainst.

4. The tensioner device according to claim 1, wherein the oil reservoir surrounds the cavity.

5. The tensioner device according to claim 1, further comprising a seal supported by the housing and in sliding engagement with the plunger.

6. The tensioner device according to claim 1, further comprising an annular wall disposed between the cavity and the oil reservoir.

7. The tensioner device according to claim 1, further comprising a pivoting shoe that is engaged with the plunger and the pivoting shoe is disposed vertically below the plunger and the oil passage is disposed vertically above the plunger.

8. A chain drive system, comprising:
   a first sprocket;
   a second sprocket;
   a chain drivingly engaged with the first and second sprockets; and
   a tensioner device having a housing defining a cavity having a vertically upper end and a vertically lower end, a plunger disposed in said cavity and extending from the vertically lower end of said cavity, a spring engaged with the plunger for biasing the plunger vertically downward in an outward direction, an oil passage placed at the vertically upper end of the cavity for delivering pressurized oil to the cavity, and an oil reservoir disposed in the vertically lower end of the housing and in communication with the cavity, the oil reservoir having a vent opening at a vertical level at least as high as the oil passage into the cavity.

9. The chain drive system according to claim 8, further comprising a pivoting shoe that is engaged with the plunger and the chain for applying a tension force there against.

10. The chain drive system according to claim 8, wherein the oil reservoir surrounds the cavity.

11. The chain drive system according to claim 8, further comprising a seal supported by the housing and in sliding engagement with the plunger.

12. The chain drive system according to claim 8, further comprising an annular wall disposed between the cavity and the oil reservoir.

13. The chain drive system according to claim 8, further comprising a pivoting shoe that is engaged with the plunger and the pivoting shoe is disposed vertically below the plunger and the oil passage is disposed vertically above the plunger.

14. A belt drive system, comprising:
   a first pulley;
   a second pulley;
   a belt drivingly engaged with the first and second pulleys; and
   a tensioner device engaging the belt and having a housing defining a cavity having a vertically upper end and a vertically lower end, a plunger disposed in said cavity and extending from the vertically lower end of said cavity, a spring engaged with the plunger for biasing the plunger vertically downward in an outward direction, an oil passage placed at the vertically upper end of the cavity for delivering pressurized oil to the cavity, and an oil reservoir disposed in the vertically lower end of the housing and in communication with the cavity, the oil reservoir having a vent opening at a vertical level at least as high as the oil passage into the cavity.

15. The belt drive system according to claim 14, further comprising a pivoting shoe that is engaged with the plunger and the belt for applying a tension force thereagainst.

16. The belt drive system according to claim 14, wherein the oil reservoir surrounds the cavity.

17. The belt drive system according to claim 14, further comprising a seal supported by the housing and in sliding engagement with the plunger.

18. The belt drive system according to claim 14, further comprising an annular wall disposed between the cavity and the oil reservoir.

19. The belt drive system according to claim 14, further comprising a pivoting shoe that is engaged with the plunger and the pivoting shoe is disposed vertically below the plunger and the oil passage is disposed vertically above the plunger.

\* \* \* \* \*